US008015483B2

(12) United States Patent
Vishwanath et al.

(10) Patent No.: US 8,015,483 B2
(45) Date of Patent: Sep. 6, 2011

(54) PROCESSING AN XML FEED WITH EXTENSIBLE OR NON-TYPED ELEMENTS (75) Inventors: Tirunelveli R. Vishwanath, Redmond, WA (US); Stephen Jared Maine, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1093 days.

(21) Appl. No.: 11/671,798

(22) Filed: Feb. 6, 2007

(65) Prior Publication Data

US 2008/0098373 A1  Apr. 24, 2008

Related U.S. Application Data (60) Provisional application No. 60/862,399, filed on Oct. 20, 2006.

(51) Int. Cl.
G06F 7/00 (2006.01)
(52) U.S. Cl. ............ 715/234; 707/701; 717/147
(58) Field of Classification Search ............ 707/809, 707/701; 715/239, 234; 717/147
See application file for complete search history.

(56) References Cited

U.S. PATENT DOCUMENTS

| 6,377,953 B1 * | 4/2002 | Gawlick et al. ............... 707/701 |
| 6,785,685 B2 | 8/2004 | Soetarman et al. |
| 6,898,604 B1 | 5/2005 | Ballinger et al. |
| 7,020,666 B2 | 3/2006 | Doise et al. |
| 7,051,042 B2 * | 5/2006 | Krishnaprasad et al. ............... 707/999.102 |
| 7,676,481 B2 * | 3/2010 | Kathuria et al. ....... 707/999.101 |
| 7,730,467 B1 * | 6/2010 | Hejlsberg et al. ............ 717/143 |
| 2001/0029604 A1 | 10/2001 | Dreyband et al. |
| 2002/0073091 A1 | 6/2002 | Jain et al. |
| 2003/0172196 A1 * | 9/2003 | Hejlsberg et al. ............. 709/328 |
| 2003/0191803 A1 * | 10/2003 | Chinnici et al. ............. 709/203 |
| 2004/0177080 A1 * | 9/2004 | Doise et al. ................... 707/100 |
| 2005/0278358 A1 | 12/2005 | Doughan |
| 2006/0150083 A1 | 7/2006 | Jazdzewski et al. |
| 2006/0248112 A1 | 11/2006 | Williams et al. |

FOREIGN PATENT DOCUMENTS

JP   2005056363   3/2005

(Continued)

OTHER PUBLICATIONS

Zaidman, Andy et al. "Applying Webmining Techniques to Execution Traces to Support the Program Comprehension Process" 2005, IEEE Computer Society.*
"Accessing Strongly Typed XML Data Using XPathNavigator," Author Unknown, Copyright 2006 Microsoft Corporation, [online] [retrieved on Dec. 11, 2006], 8 pgs. Retrieved from the Internet: http://msdn2.microsoft.com/en-us/library/1bkbyzbb(vs.80).aspx.

(Continued)

Primary Examiner — Adam M Queler
Assistant Examiner — Tyler J Schallhorn
(74) Attorney, Agent, or Firm — Workman Nydegger (57) ABSTRACT A computerized system that implements a type system can process one or more XML documents that comprise unknown schema elements, which may not correlate within one or more types in the type system. In one implementation, for example, a computer system receives one or more XML document feeds and deserializes only those schema elements that correlate with one or more system types. The computer system further passes the unknown schema elements to a buffer. An application program, such as an XML reader, can extract the unknown schema elements from the buffer as appropriate. In one implementation, for example, the application program maintains its own types separately from the system types. The application program can then correlate its application-specific types with the buffered schema elements to deserialize and process the buffered schema elements.

19 Claims, 3 Drawing Sheets

FOREIGN PATENT DOCUMENTS

JP            2006209745          8/2006

OTHER PUBLICATIONS

"XML-Based Static Type Checking and Dynamic Visualization for TCOZ," by Jin Song Dong, Yuan Fang Li, Jin Sun, Jun Sun, and Hai Wang, School of Computing, National University of Singapore, Copyright 2002 Springer-Verlag Berlin Heidelberg, [online] [retrieved on Dec. 8, 2006], pp. 311-322. Retrieved from the Internet: http://www.comp.nus.edu.sg/~dongjs/papers/icfem02dIssw.pdf.

"Intelligent Agents and XML—A Method for Accessing Webportals in Both B2C and B2B E-Commerce," by Jorg R. Muhlbacher, Susanne Reisinger, and Michael Sonntag, date unknown, [online] [retrieved on Dec. 8, 2006], 6 pgs.. Retrieved from the Internet: http://www.fim.uni-linz.ac.at/Publications/Chef/Intelligent%20Agents%20and%20XML%20.pdf.

"Type Checking with XML Schema in XACT," by Christian Kirkegaard and Anders Moller, Department of Computer Science, University of Aarhus, Denmark, date unknown, [online] [retrieved on Dec. 8, 2006], 10 pgs. Retrieved from the Internet: http://www.brics.dk/~amoeller/papers/xactschemas/paper.pdf.

* cited by examiner

PROCESSING AN XML FEED WITH EXTENSIBLE OR NON-TYPED ELEMENTS

CROSS-REFERENCE TO RELATED APPLICATIONS

The present invention claims the benefit of priority to U.S. Provisional Patent Application No. 60/862,399, filed Oct. 20, 2006, entitled "Partially Typed Programming Model for Extensible XML Constructs," the entire contents of which are incorporated herein by reference.

BACKGROUND

Background and Relevant Art

As computerized systems have increased in popularity, so have the various application programs and documents used on the computerized systems. In particular, there are now a wide range of applications programs configured for any number of purposes, whether to function as complex operating systems, databases, and so forth, or to function as a more simple application program configured for a narrow purpose. In many cases, software developers will write new application programs with a particular operating system in mind, using any number of appropriate programming languages. Once the software is complete, the developer will compile the application into machine-executable code, which can then be installed on a computer system with the appropriate operating system.

One will appreciate, therefore, that there are a number of considerations that often must be taken into account by developers of operating systems as well as developers of the individual application programs. Many of these interests may even be competing. For example, many application program developers may have interests related to fast and customizable operation, while many operating system developers may have interests related to security and stability. In some cases, the security and stability requirements can restrict the speed and customizability of the way some application programs operate.

One area in which this tension can be apparent is with certain kinds of object-oriented operating system systems built to employ a "type" system. In a type system, functions or arguments are correlated with a type, which can define how the function or argument needs to appear before it can be processed, and/or what components might be required to handle the function or argument. In a type system, the operating system is configured so that only those functions or arguments that correspond to an understood or well-defined type can be processed or executed.

For example, one "type" might include a program class configured to expose two integer values. A type-safe operating system based at least in part on this type might thus prohibit any application from exposing an integer value and a floating point value through this program class. Similarly, a type-safe application program that is compiled with type-safe code might also be unable to expose an integer value and a floating point value through this particular program class. While this level of rigid conformance to types can be beneficial to ensuring operating system stability or safety, type-based systems can be difficult to deal with where code flexibility is desired.

One recent area of development in which such code flexibility is prevalent is in the use of XML (Xtensible Markup Language). In particular, one advantage of some XML formats is that the document author and/or corresponding reader application creator may have a certain amount of flexibility to define or execute the document schema. The document schema, in turn, refers to several elements and sub-elements of the XML that define how a computer system is to display or otherwise process the XML document content. This flexibility of XML document schemas can be particularly apparent with some XML formats that allow for "wild card extensibility."

Some examples of XML languages that incorporate wild card extensibility include ATOM and RSS ("Really Simple Syndication," or "Rich Site Summary"). For example, a user at a local client computer system might subscribe to an online news or web-log ("blog") feed containing one or more XML documents formatted for one or more of RSS or ATOM. A local application program (e.g., an RSS or ATOM reader) might then periodically download a serialized form of the XML document from the online news or blog server, each time creating an instance of the XML document. Upon download, the user's application program (e.g., RSS or ATOM reader) also deserializes each element/schema of the document feed and reads/executes the document in accordance with the document schema.

Unfortunately, use of formats that allow for wild card extensibility (e.g., RSS or ATOM) can create conflicts with type-safe operating systems. With respect to the aforementioned class example, wildcard extensibility might allow a document author to set up an XML schema that exposes "two integers, and a string" (as before) as well as "any number of other, unknown and un-described data elements." Similarly, or in addition, wildcard extensibility might allow a document author to have an XML schema that includes one or more links to news or blog comments, where traditional XML might only be set up to handle entries for the main news/blog portion of a document.

Thus, when a client computer system tries to deserialize a feed that includes schemas that do not correspond to a known type, or wild card schemas that have not otherwise been expressly allowed, the operating system (or type-safe application) might deem the XML document unsafe. One can appreciate, therefore, that the flexibility in schema usage between documents from one site to another, and even from one document instance to another in the same site, can present a significant challenge to type-safe operating environments. Such challenges and potential conflicts are likely to increase since wild-card extensibility and type-based operating environments are increasingly common.

BRIEF SUMMARY

Implementations of the present invention provide systems, methods, and computer program products that enable type-safe operating environments to handle all or part of an XML document feed containing extensible elements. In one implementation, for example, an operating system receives an XML document containing syndication data (e.g., RSS, ATOM, etc.) and deserializes known schema elements corresponding to known system types. The system then buffers unrecognized or extensible schema elements. An application program receiving the feed can then extract the unknown schema elements from the buffer as appropriate, such as using application-specific types.

For example, a method from the perspective of a client computer system of processing a serialized XML document that includes typed schema elements and non-typed schema elements can involve receiving one or more serialized XML documents over a network. The method can also involve identifying one or more known schema elements of the one or more XML documents. For example, the one or more known schema elements correlate to one or more known system types at the client computer system. In addition, the method can involve identifying one or more unknown schema elements of the one or more XML documents. For example, the one or more unknown schema elements do not correlate to the one or more known system types.

The method can also involve providing a deserialized form of the one or more known schema elements to an application program. Furthermore, the method can involve buffering the one or more unknown schema elements in the serialized format received via the one or more serialized XML feeds.

In addition, a method from the perspective of an application program, such as an XML reader, of processing a serialized XML feed that includes non-typed schema elements of one or more XML documents can involve receiving one or more deserialized schema elements of an XML document via one or more XML feeds. For example, the one or more deserialized schema elements correspond to a type in the client computer's type system. The method can also involve identifying the presence of one or more unknown schema elements for the XML documents in a buffer. For example, the one or more unknown schema elements do not correspond to any type in the type system.

In addition, the method can involve an application program (e.g., an XML reader) correlating one or more of the unknown schema elements with one or more application-specific types that are maintained by the application program. Furthermore, the method can involve extracting at least one of the one or more unknown schema elements. In general, this will be done using at least one of the one or more application-specific types maintained by the application program.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Implementations of the present invention extend to systems, methods, and computer program products that enable type-safe operating environments to handle all or part of an XML document feed containing extensible elements. In one implementation, for example, an operating system receives an XML document containing syndication data (e.g., RSS, ATOM, etc.) and deserializes known schema elements corresponding to known system types. The system then buffers unrecognized or extensible schema elements. An application program receiving the feed can then extract the unknown schema elements from the buffer as appropriate, such as using application-specific types.

Accordingly, and as will be appreciated more fully herein, implementations of the present invention provide a programming model that allows for the processing of a wide range of XML data elements. Specifically, implementations of the present invention can provide strongly-typed access to XML data elements that are described in the schema or grammar of the incoming XML document feed. Implementations of the present invention can also provide applications with the ability to access, in a loosely typed way, the XML data elements that are not necessarily associated with a particular type. As will be understood more fully herein, an application program may be able to access these non-typed data elements via a streaming reader, node set, or equivalent.

In addition, implementations of the present invention can support incremental deserialization of data over time. For example, specific, unknown schema elements that the system places into a buffer can be converted to an instance of a typed object representation. In general, these data elements are not deserialized immediately. Instead, they are preserved in an accessible buffer indexed by the qualified name of the unknown element. An application program can then extract these individual elements (or sets of elements) from the buffer, either as raw XML nodes, or as instances of a type provided by the application program.

One will appreciate, therefore, that implementations of the present invention can be thought of as defining a general pattern for processing extensible XML document schema elements in a closed, statically-defined type system. That is, known schema elements can be mapped with known members of the type system, while unknown schema elements can be buffered into a data structure that allows them to be retrieved later when more context is known about their contents. This allows an application program, such as an XML reader, to partially process an XML document feed in some cases.

Figure 1A:
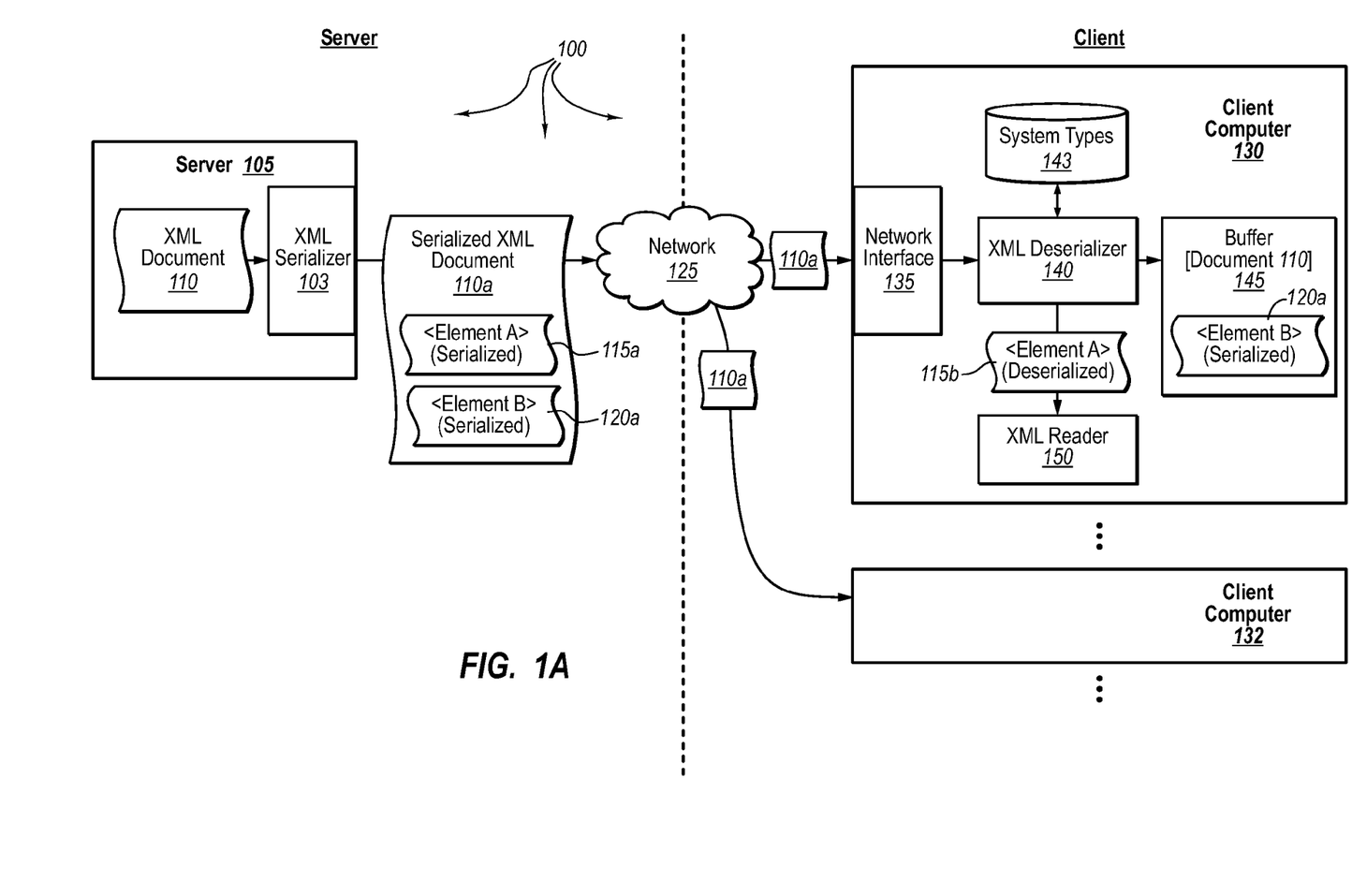
FIG. 1A illustrates an overview schematic diagram in accordance with an implementation of the present invention in which a server sends (via push or pull mechanisms) one or more serialized XML documents to a client computer system.

Referring now to the Figures, FIG. 1A illustrates an overview schematic diagram of a computerized environment 100 in accordance with an implementation of the present invention. As shown, computerized environment 100 can comprise one or more servers 105, which send document feeds to one or more client computer systems 130, 132. In particular, FIG. 1A illustrates an implementation in which server 105 sends an XML document 110, which includes both known and unknown XML schema elements, to client computer systems 130, 132.

In general, XML document 110 can comprise any type of document sent via a subscription feed, such as a news or a blog article in XML format. XML document 110 can also include a portion of a particular web page that is later extracted and formatted (e.g., in XML) for subscription feed services. In addition to being formatted in XML, the individual XML schema elements of document 110 may be formatted more specifically in accordance with any other specific XML languages, such as RSS or ATOM, which have different standards for extensibility.

In general, both RSS and ATOM are at least some of the XML languages known to support protocol extensibility through the presence of additional namespace-qualified elements. With respect to these particular formats, any XML schema element not specifically defined in the RSS or ATOM specification can be present at a "Feed" or "Item" level, so long as the namespace of that element does not match the root namespace of the enclosing feed. In some cases, ATOM make take this concept further, such as by allowing almost all complex constructs (e.g., "Person," and "Category") to be extended. Implementations of the present invention, therefore, can support this concept in the core Feed/Item object model.

In any case, XML document 110 will be understood to comprise any one or more elements, at least one of which may not correspond to a particular "type" at a client computer system. For example, each of the schema elements of XML document 110 could correspond to one or more system types at server 105, however the system types at server 105 may or may not be used by client computer systems 130, 132. At least one reason for this is that the operating system for server 105 may not be the same as the operating systems used by client computer 130 and/or 132. Thus, server 105 will generally need to divorce any type associations from XML document 110 before sending XML document 110 onward in a subscription feed.

Prior to sending XML document 110 to a particular client system, FIG. 1A shows that server 105 first serializes XML document 110. For example, FIG. 1A shows that server 105 serializes XML document 110 through one or more XML serializers 103. In one implementation, the one or more XML serializers 103 are configured to change the XML document 110 content to a binary format prior to transmission through network 125. In at least one implementation, the one or more XML serializers 103 can also be configured to remove any server-specific type associations with any of the schema elements in XML document 110, as previously mentioned.

However performed and with whatever components used, FIG. 1A shows that server 105 sends XML document 110 in serialized form as XML document 110*a* using one or more XML feeds. For example, FIG. 1A shows that serialized XML document 110*a* comprises a serialized form of "Element A" 115*a*, as well as a serialized form of "Element B" 120*a*, both of which are serialized schema elements. This serialized form of the document is what is received by client computer systems 130 and 132 via network 125. As understood more fully herein, the one or more computer systems 130, 132 can then process the serialized XML document 110*a* in whole or in part, as appropriate.

For example, FIG. 1A shows that client computer system 130 receives serialized XML document 110*a* through network interface 135, which forwards the document to one or more deserializer components, such as XML deserializer 140. In general, the one or more deserializer components are configure to convert the XML document 110*a* content from the serialized form (e.g., binary) back to its original form from before server transmission. Rather than deserialize the entire XML document 110 in this case, however, FIG. 1A shows that XML deserializer 140 only deserializes the document in parts, in accordance with correlated system types.

In one implementation with respect to a MICROSOFT operating environment, for example, the one or more deserializers (e.g., 140) can comprise an "IExtensibleFeedObject," which exposes a collection of IXmlSerializable objects. In this implementation, the IXmlSerializable objects contain the set of to-be-serialized schema elements (e.g., stored in buffer 145). The client operating system 130 can then use one or more of these objects to provide one or more "helper classes" for wrapping objects that are not natively IXmlSerializable (e.g., "DataContract" types and "XmlElement") for storage in buffer 145. Of course, one will appreciate, that reference herein to any particular operating system environment or operating component, such as a MICROSOFT operating environment(s) or component(s) is done by way of convenience in description. In particular, implementations of the present invention can be applied to a wide range of operating systems and corresponding components.

In any event, FIG. 1A shows that XML deserializer 140 passes a deserialized form of "Element A" 115*a* to an application program (i.e., "XML reader 150"). This is done since XML deserializer 140 has determined in this case that there is a corresponding type in system types 143 for "Element A." By contrast, however, XML deserializer 140 does not identify any of the one or more system types 143 that would correspond with "Element B." Accordingly, deserializer 140 does not deserialize Element B 120*b* at this time, but passes the serialized form (as received) of Element B 120*a* to buffer 145. In one implementation, deserializer 140 also maps the one or more unknown schema elements (e.g., Element B 120*a*) to an object graph (not shown).

Figure 1B:
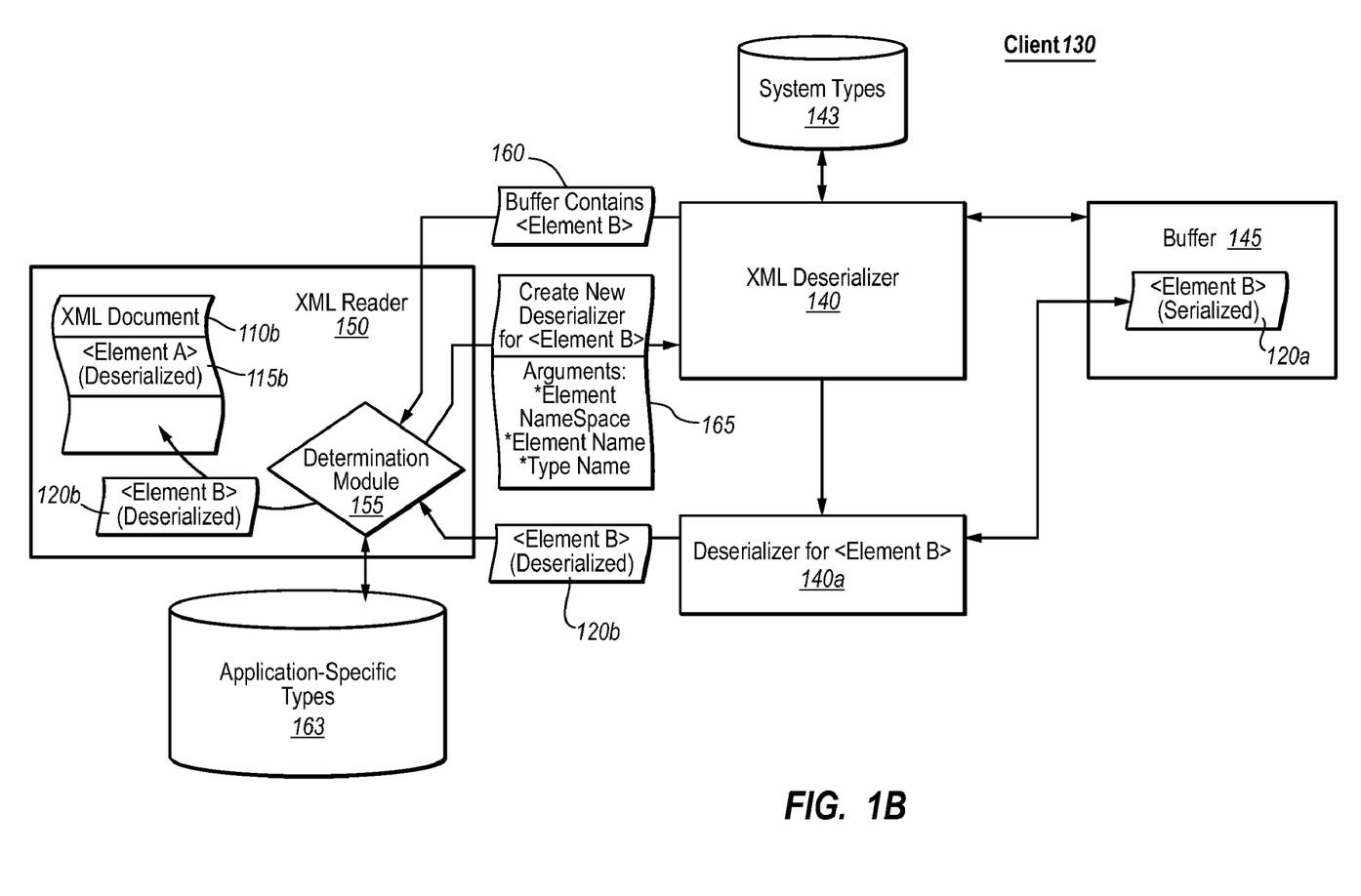
FIG. 1B illustrates a schematic diagram in accordance with an implementation of the present invention in which a client computer system processes both typed and non-typed elements of the XML document shown in FIG. 1B.

FIG. 1B illustrates a more detailed schematic diagram of one or more of the interactions that can occur between the above-described components. In particular, FIG. 1B illustrates one or more communications (and/or corresponding actions) that can occur between an application program and a deserializer when extracting the serialized elements in the buffer 145. With respect to an exemplary MICROSOFT environment, for example, the IExtensibleFeedObject can act as buffer 145 for unknown extension data. This object can further provide methods and/or corresponding application program interfaces ("APIs") (e.g., deserializer 140) for retrieving the one or more buffered schema elements on a per-element basis, and deserializing individual schema elements as an application-specific (e.g., user-provided) type. As understood herein, this buffer and corresponding objects/APIs allow an XML document to be deserialized into an instance of a "Feed" at client computer 130, without necessarily requiring the "Feed class" to have up-front knowledge of all possible extensions it might contain.

For example, FIG. 1B shows that, when Element B 120*a* is buffered, deserializer 140 sends one or more messages to XML reader 150 indicating the presence of this element (and/or other unknown schema elements). The one or more messages 160 can also include information that the buffered elements either correspond to an unknown type, or do not correspond to one of the system types 143. For example, FIG. 1B shows that message 160 indicates at least the element names of the elements that are still serialized and/or otherwise stored in buffer 145.

Accordingly, FIG. 1B shows that XML reader 150 receives message 160 and processes it through one or more determination modules 155. In one implementation, for example, the one or more determination modules 155 can compare the element names included in message 160 with any application-specific types, which generally include types that are separately maintained by the application program. For example, FIG. 1B shows that XML reader 150 compares the identified elements ("Element B") with application-specific types 163. In some cases, XML reader 150 will identify no application-specific type(s) corresponding to the buffered Element B 120a. In such a case, XML reader 150 would simply process (e.g., render for display) those schema elements in the document that are typed (i.e., associated with a system type), and for which XML reader 150 has received the deserialized information. In this particular case, however, XML reader 150 identifies an application-specific type that correlates with the buffered "Element B" 120a.

As such, FIG. 1B shows that XML reader 150 can request the unknown, buffered schema element ("Element B") in any number of ways. In one implementation, for example, XML reader 150 could simply request the raw XML nodes (not shown) by requesting Element B 120a using the element's name and namespace. To request a deserialized form of this schema element, however, FIG. 1B shows that XML reader 150 prepares and sends message 165 to XML deserializer 140. In this example, FIG. 1B shows that message 165 includes information regarding the element name (i.e., "Element B" 120a), element namespace, as well as the name of the application-specific type that is maintained by XML reader 150. FIG. 1B also shows that message 165 includes a request to create a deserializer 140a specific to "Element B."

In response, FIG. 1B shows that XML deserializer 140 creates the new deserializer 140a, which is specific for the buffered Element B 120a. FIG. 1B further shows that deserializer 140a extracts and deserializes "Element B" 120a to create deserialized form 120b. Deserializer 140a then passes the deserialized Element B 120b to an appropriate component of XML reader 150, such as determination module 155. XML reader 150 then assembles the deserialized Element B 120b along with deserialized Element A 115b in XML document 110b. XML reader 150 can then read the various element schemas to provide (e.g., render for display) the corresponding elements of XML document 110b, as intended.

Accordingly, FIGS. 1A-1B illustrate a number of different components and mechanisms for allowing type-based systems to process documents that include non-typed elements. As described, this can be done using system types as well as application-specific types, and can be done so that an application processes a particular document feed only in part (e.g., where no system or application-specific types are found for certain schema elements).

Figure 2:
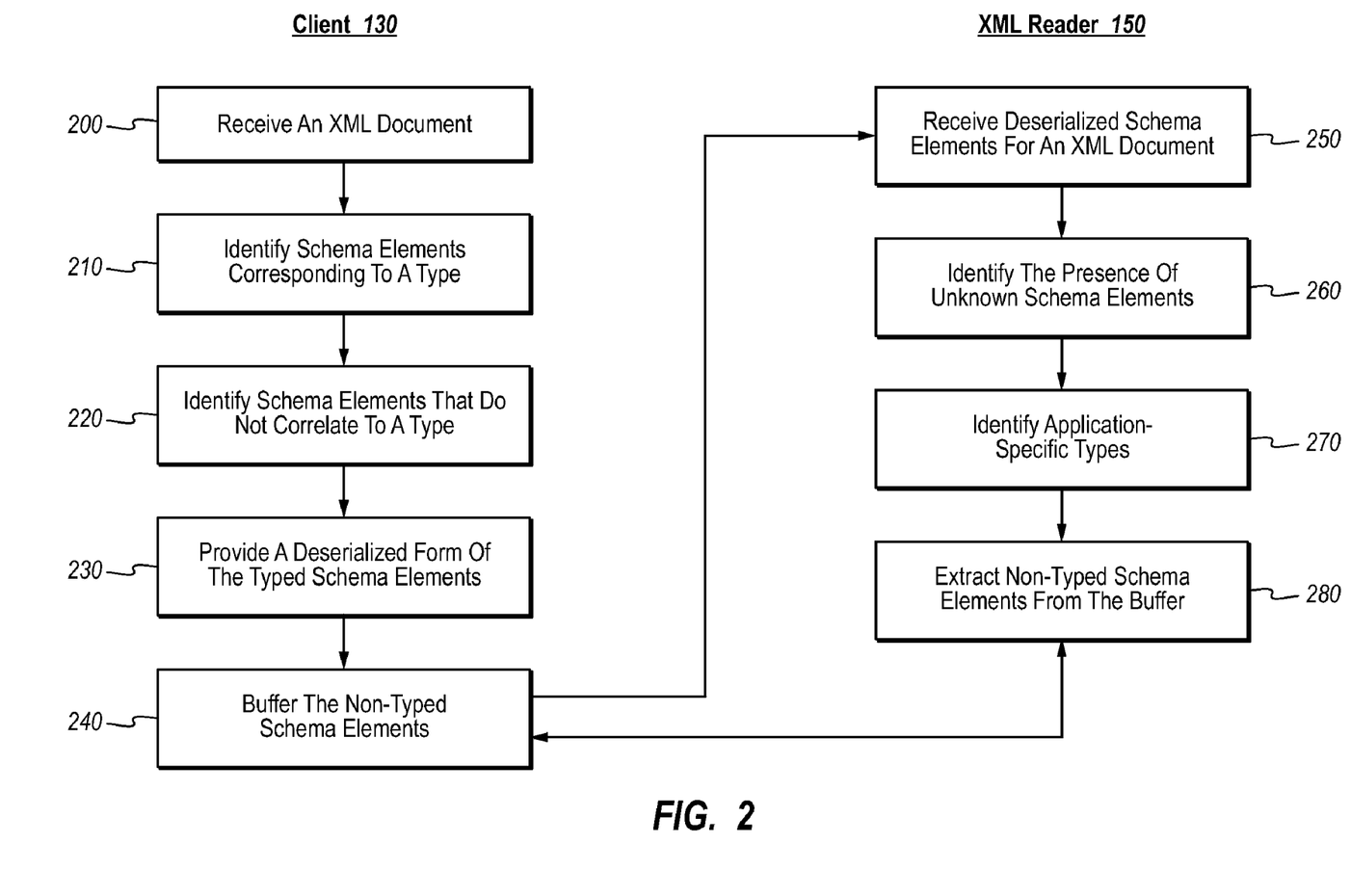
FIG. 2 illustrates flowcharts of a series of acts in methods in accordance with an implementation of the present invention from the perspectives of a server and a client computer system for sending and processing one or more XML documents having typed and non-typed elements.

In addition to the foregoing, implementations of the present invention can also be described in terms of one or more flow charts of one or more acts in a method for accomplishing a particular result. For example, FIG. 2 illustrates methods from the perspective of client 130 and XML reader 150 for processing a serialized XML document that includes typed schema elements and non-typed schema elements. The methods and corresponding acts illustrated in FIG. 2 are described below with respect to the components and modules of FIGS. 1A and 1B.

For example, FIG. 2 shows that a method from a client 130 perspective of processing a serialized XML document that includes typed schema elements and non-typed schema elements can comprise an act 200 of receiving an XML document. Act 200 includes receiving one or more serialized XML documents over a network. For example, client computer system 130 has one or more subscriptions to XML document 110 at server 105. At an appropriate time, FIG. 1A shows that server 105 sends XML document 110 as one or more of an RSS or ATOM (or other extensible format) feed to client computer system 130 via network 125. Client computer system 130 then receives XML document 110 in serialized form, whereby each of the elements (e.g., "Element A" 115a and "Element B" 120a) in the XML document 110a are serialized.

FIG. 2 also shows that the method from the perspective of client 130 can comprise an act 210 of identifying schema elements corresponding to a type. Act 210 includes identifying one or more known schema elements of the one or more XML documents via one or more XML feeds, wherein the one or more known schema elements correlate to one or more known system types at the client computer system. For example, FIG. 1A shows that XML deserializer 140 identifies that Element A 115a corresponds to a known type of the one or more system types 143. XML deserializer 140 then deserializes Element A 115a to create the deserialized form 115b, and passes this deserialized form 115b to XML reader 150 for further processing.

In addition, FIG. 2 shows that the method from the perspective of client 130 can comprise an act 220 of identifying schema elements that do not correlate to a type. Act 220 includes identifying one or more unknown schema elements of the one or more XML documents, wherein the one or more unknown schema elements do not correlate to the one or more known system types. For example, FIG. 1A shows that XML deserializer 140 does not identify a particular system type 143 for Element B 120a. Accordingly, XML deserializer 140 passes the unknown schema Element B (in serialized form 120a) to buffer 145.

Furthermore, FIG. 2 shows that the method from the perspective of client 130 can comprise an act 230 of providing a deserialized form of the one or more known schema elements to an application program. Act 230 includes providing a deserialized form of the one or more known schema elements to an application program. For example, FIG. 1A shows that XML deserializer 140 deserializes and sends the deserialized form of Element A 115b to XML reader 150.

Still further, FIG. 2 shows that the method from the perspective of client 130 can comprise an act 240 of buffering the non-typed schema elements. Act 240 includes buffering the one or more unknown schema elements in the serialized format received via the one or more serialized XML feeds. For example, FIGS. 1A and 1B show that Element B 120a is stored in serialized form in buffer 145, since deserializer 140 cannot identify any system types 143 to correlate therewith.

In addition to the foregoing, FIG. 2 shows that a method from the perspective of an application program, such as XML reader 150, of processing a serialized XML feed that includes non-typed schema elements of one or more XML documents can comprise an act 250 of receiving deserialized schema elements for an XML document. Act 250 includes receiving one or more deserialized schema elements of one or more XML documents via one or more XML feeds, wherein the one or more deserialized schema elements correspond to a system type in the client computer's type system. For example, FIG. 1A shows that XML reader 150 receives the deserialized form of at least one of the elements (e.g., Element A 115b) of XML document 110, whereby Element A was automatically deserialized and sent to the application program since it correlates with a known system type.

FIG. 2 also shows that the method from the perspective of XML reader 150 can comprise an act 260 of identifying the presence of unknown schema elements. Act 260 includes identifying the presence of one or more unknown schema elements of the one or more XML documents in a buffer, wherein the one or more unknown schema elements do not correspond to any type in the type system. For example, FIG. 1B shows that XML reader 150 receives one or more messages 160 from XML deserializer 140. In at least one implementation, the one or more messages 160 indicate that one or more elements (e.g., Element B 120*a*) do not correlate with a system type 143, and are thus stored in buffer 145.

In addition, the method from the perspective of XML reader 150 can comprise an act 270 of identifying application-specific types. Act 270 includes the application program correlating one or more of the unknown schema elements with one or more application-specific types that are maintained by the application program. For example, FIG. 1B shows that XML reader 150 compares (e.g., via determination module 155) the information included in message 160 with the application-specific types 163. FIG. 1B further shows that XML reader (e.g., via determination module 155) identifies a type for the buffered element.

Furthermore, the method from the perspective of XML reader 150 can comprise an act 280 of extracting the non-typed schema elements from the buffer. Act 280 includes extracting at least one of the one or more unknown schema elements using at least one of the one or more application-specific types maintained by the application program. For example, FIG. 1B shows that XML reader 150 sends one or more messages 165 to XML deserializer 140 to create a new deserializer for Element B 120*a*. As shown, message 165 can include any number of different arguments including the element namespace for Element B, the element name, and the corresponding type name from application-specific types 163. Deserializer 140*a* is then used to deserialize Element B 120*a* into 120*b*, which can then be used to process the remainder of XML document 110*b*.

Accordingly, FIGS. 1A through 2 illustrate a number of different components and mechanisms for processing documents that include un-typed or non-typed schema elements (e.g., wildcard extensible elements) in type-based operating systems. For example, implementations of the present invention provide one or more data structures for storing extension data in a strongly typed object graph prior to serialization. This data itself can be a strongly-typed object graph, or a set of raw XML nodes. Implementations of the present invention also provide one or more data structures for buffering unknown XML elements encountered during deserialization for later conversion into typed data. In addition, implementations of the present invention provide one or more APIs for retrieving elements individually (e.g., in XML form) from an extension buffer using XML element name(s) and namespace(s). Furthermore, implementations of the present invention provide one or more APIs for retrieving these elements individually (again by name and namespace) as instances of an application-specific type.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method of processing a serialized XML document that includes typed schema elements and non-typed schema elements, the method performed at a client computer system comprising one or more computer processors, wherein the client computer system employs a type system having one or more types, the method comprising:
    receiving one or more serialized XML documents over a network;
    identifying one or more known schema elements of the one or more XML documents, wherein the one or more known schema elements correlate to one or more known system types at the client computer system;
    identifying one or more unknown schema elements of the one or more XML documents, wherein the one or more unknown schema elements do not correlate to any of the one or more known system types;
    providing a deserialized form of the one or more known schema elements to an application program;
    storing the one or more unknown schema elements in an unknown element buffer data structure, wherein the one or more unknown schema elements are recorded in the serialized format received over the network, wherein the unknown element buffer data structure is separate and distinct from the received one or more serialized XML documents and wherein the unknown element buffer data structure comprises no known schema elements of the one or more XML documents which correlate to one or more known system types at the client computer system; and
    providing the application program with the at least one of the one or more buffered schema elements as one or more raw XML nodes.

2. The method as recited in claim 1, wherein the one or more unknown schema elements are extensible XML, the method further comprising storing the one or more unknown schema elements in an object graph.

3. The method as recited in claim 2, wherein the one or more unknown schema elements are formatted in one of RSS or ATOM.

4. The method as recited in claim 1, wherein the one or more serialized XML documents are received through one or more deserializer components, the one or more deserializer components being configured to deserialize the one or more known schema elements and pass the one or more unknown schema elements to the unknown element buffer data structure.

5. The method as recited in claim 1, further comprising an act of the one or more deserializer components sending one or more messages to the application program that the one or more unknown schema elements are buffered.

6. The method as recited in claim 5, further comprising an act of receiving one or more requests for at least one of the one or more buffered schema elements.

7. The method as recited in claim 6, wherein the one or more requests include one or more names of the one or more buffered schema elements, and one or more namespaces of the one or more buffered schema elements.

8. The method as recited in claim 7, wherein the one or more requests further comprise one or more application-specific type names corresponding to the at least one buffered schema element.

9. The method as recited in claim 8, further comprising an act of sending the deserialized one or more buffered schema elements to the application program.

10. The method as recited in claim 8, further comprising an act of creating one or more new deserializer components corresponding to each of the one or more requests.

11. The method as recited in claim 10, further comprising an act of deserializing the one or more buffered schema elements corresponding to the one or more requests via the one or more new deserializer components.

12. A method of an application program processing a serialized XML feed that includes non-typed schema elements of one or more XML documents, the method performed in a computer system in which the computer system employs a type system having one or more types, the method comprising:
receiving one or more deserialized schema elements of one or more XML documents via one or more XML feeds, wherein the one or more deserialized schema elements correspond to a system type in the computer's type system;
identifying within a buffer the presence of one or more unknown schema elements of the one or more XML documents, wherein the one or more unknown schema elements do not correspond to any type in the type system, wherein the one or more unknown schema elements are stored within the buffer in a serialized format corresponding to the XML feed, wherein the buffer is separate and distinct from the received one or more XML documents, and wherein the buffer comprises no schema elements of the one or more XML documents which correspond to a system type in the computer's type system;
the application program correlating one or more of the unknown schema elements with one or more application-specific types that are maintained by the application program; and
extracting from the buffer at least one of the one or more unknown schema elements using at least one of the one or more application-specific types maintained by the application program, wherein extracting from the buffer comprises extracting the at least one of the one or more unknown schema elements from the buffer as a raw XML node.

13. The method as recited in claim 12, further comprising an act of processing the one or more XML documents in part, wherein the application program processes some but not all of the one or more of the unknown schema elements with the one or more deserialized schema elements of the one or more XML documents.

14. The method as recited in claim 12, wherein identifying the presence the one or more unknown schema elements further comprises an act of receiving one or more messages indicating the presence of one or more buffered schema elements that correspond to the one or more XML documents.

15. The method as recited in claim 12, wherein extracting from the buffer comprises deserializing a serialized schema element.

16. The method as recited in claim 12, further comprising an act of sending one or more requests to create one or more deserializer components corresponding to the one or more unknown schema elements.

17. The method as recited in claim 16, further comprising an act of receiving the one or more unknown schema elements in deserialized form.

18. The method as recited in claim 16, wherein the one or more requests to create one or more deserializer components includes, for each of the one or more unknown schema elements, an element name, an element namespace, and an application-specific type name.

19. A computer program product for use at a computer system, wherein the computer system includes a type system having one or more types, the computer program product comprising one or more computer storage devices having computer-executable instructions stored thereon that, when executed, cause one or more processes at the computer system to perform the method of claim 1.

* * * * *